United States Patent [19]
Kobayashi et al.

[11] Patent Number: 5,605,998
[45] Date of Patent: Feb. 25, 1997

[54] METHOD FOR PRODUCING POLYCARBOSILANES

[75] Inventors: Toshi-aki Kobayashi; Masato Tanaka, both of Tsukuba, Japan

[73] Assignee: Director-General of Agency of Industrial Science and Technology, Tokyo, Japan

[21] Appl. No.: 401,913

[22] Filed: Mar. 9, 1995

[30] Foreign Application Priority Data

Mar. 11, 1994 [JP] Japan ................................ 6-068022

[51] Int. Cl.$^6$ ................................................ C08G 77/08
[52] U.S. Cl. .............................. 528/19; 528/31; 528/14; 556/430; 556/435
[58] Field of Search .................................. 556/430, 435; 528/31, 19, 14

[56] References Cited

U.S. PATENT DOCUMENTS 4,965,386  10/1990  Watson et al. .

FOREIGN PATENT DOCUMENTS 4-124189  4/1992  Japan .

*Primary Examiner*—Melvyn I. Marquis
*Attorney, Agent, or Firm*—Birch, Stewart, Kolasch & Birch, LLP

[57] ABSTRACT

There is disclosed a method for producing polycarbosilanes, comprising polymerizing silane of the formula $SiH_4$ with dienes in the presence of a rare earth metal complex. Polycarbosilanes useful as photoreactive materials and as raw material of silicon carbide-series ceramics can be obtained in a high yield from silane ($SiH_4$) and dienes.

15 Claims, No Drawings

5,605,998

METHOD FOR PRODUCING POLYCARBOSILANES

FIELD OF THE INVENTION

The present invention relates to a method for producing polycarbosilanes.

BACKGROUND OF THE INVENTION

Polycarbosilanes are useful as photoreactive materials, such as photoresists, and as raw materials of silicon carbide-series ceramics. To produce polycarbosilanes, the following methods are known:

1) a method in which polysilanes are subjected to a thermal transformation reaction;
2) a method in which dihalosilanes, dihalopolysilanes, or their equivalents (e.g., bifunctional silicon compounds, such as dialkoxysilanes, bis(dialkylamino)silanes, and dialkylthiosilanes) are subjected to a polycondensation reaction with organic dianions, such as di-Grignard reagents or dilithio organic compounds;
3) a method in which bis(chlorosilyl) organic compounds or their equivalents (e.g., compounds having two functional silyl groups in a molecule, such as bis(bromosilyl) organic compounds) are subjected to a polycondensation reaction by the Wurtz reaction; and
4) a method in which dihydrosilanes, or dihydropolysilanes, and dienes are subjected to hydrosilylation polymerization.

However, these methods have the following respective problems. That is, with respect to the method 1), because of the high temperature pyrolysis necessary to the transformation reaction, the structure of the product is irregular and it is difficult to control the reaction to obtain polycarbosilanes having the intended structure. With respect to the methods 2) and 3), the reaction uses halosilanes, which are sensitive to moisture and corrosive, and in addition, compounds that ignite spontaneously in air and sensitive to moisture, such as alkali metals, organic alkali metal compounds, and Grignard reagents, are treated. Therefore, the reaction is dangerous. The high reactivity of the reactants causes a limitation of these methods to the synthesis of compounds having sensitive functional groups. With respect to the method 4), which uses hydrosilylation polymerization, in comparison with the reactions of 1) to 3), desired polycarbosilanes can be easily designed and synthesized and the reaction conditions are mild. However, in the case of hydrosilylation reaction using silane of the molecular formula $SiH_4$, since it is considered that the transition metal complex catalyst used in the reaction is deactivated conspicuously (M. Itoh, K. Iwata, R. Takeuchi, and M. Kobayashi, J. Organomet. Chem., 420, C5 (1991)), it has not been attempted to carry out hydrosilylation polymerization using silane ($SiH_4$).

SUMMARY OF THE INVENTION

The object of the present invention is to provide a method that is free from the above defects, for producing polycarbosilanes by a hydrosilylation polymerization reaction of silane ($SiH_4$) with dienes.

Other and further objects, features, and advantages of the invention will appear more fully from the following description.

DETAILED DESCRIPTION OF THE INVENTION

The present inventors, having keenly studied to solve the above problems, have found that a rare earth metal complex exhibits a high catalytic activity for the hydrosilylation polymerization reaction of silane ($SiH_4$) with dienes, attaining the present invention.

That is, the present invention provides:

(1) a method for producing polycarbosilanes, comprising polymerizing silane of the formula $SiH_4$ with dienes in the presence of a rare earth metal complex;
(2) the method for producing polycarbosilanes as stated in the above (1), wherein the dienes are α,ω-alkadienes;
(3) the method for producing polycarbosilanes as stated in the above (1) or (2), wherein the rare earth metal complex is an organic neodymium complex; and
(4) the method for producing polycarbosilanes as stated in the above (3), wherein the organic neodymium complex is $Cp^*_2NdCH(SiMe_3)_2$, wherein $Cp^*$ represents a pentamethylcyclopentadienyl group, and Me represents a methyl group.

As the central metal of the rare earth metal complex used as a catalyst in the present invention, any one selected from rare earth metal elements (scandium, yttrium, lanthanum, cerium, praseodymium, neodymium, promethium, samarium, europium, gadolinium, terbium, dysprosium, holmium, erbium, thulium, ytterbium, and lutetium) can be mentioned, with lanthanum, neodymium, samarium, ytterbium, and lutetium preferred, and neodymium, samarium, and lutetium more preferred.

As examples of the ligand of the rare earth metal complex used as a catalyst in the present invention, mention can be made of, halogens, hydrogen, alkyl, aralkyl, aryl, alkylsilyl, arylsilyl, olefins, dienes, triens, tetraenes, cyclodienes, cyclotrienes, cyclotetraenes, allyl, alkoxy, aryloxy, alkylthio, arylthio, cyclopendadienyl, methylcylopentadienyl, dimethylcyclopentadienyl, pentamethylcyclopentadienyl, alkylamines, arylamines, pyridines, alkylphosphines, arylphosphines, alkylarylphosphines, alkylisocyanides, arylisocyanides, and ethers. These ligands may be substituted. Particularly preferable ligands are, for example, hydrogen, alkyl (preferably an alkyl group having 1 to 10 carbon atoms, such as methyl, trimethylsilylmethyl, bis(trimethylsilyl)methyl, ethyl, i-propyl, t-butyl, neopentyl, and hexyl), pentamethylcyclopentadienyl, and tetrahydrofuran (THF).

Particularly preferably the rare earth metal complex used as a catalyst in the present invention has a structure represented by the following formula (I) or (II), but the present invention is not restricted to these:

formula (I)

$$Cp'_2MR$$

formula (II)

$$Cp'_2M'$$

wherein Cp' represents a cyclopentadienyl group or its substituted group, M represents any rare earth metal, M' represents any one of samarium, europium, and ytterbium, and R represents hydrogen, an alkoxy group, a monovalent organic group, or a monovalent silyl group.

In formula (I), preferable groups for R include, for example, hydrogen, methyl, trimethylsilylmethyl, bis(trimethylsilyl)methyl, neopentyl, phenyl, and benzyl.

The rare earth metal complex used in the present invention may be used as it is, or it may be charged into the reaction system in the form of a precursor or a raw material that will produce the complex in the reaction system.

The dienes used in the present invention, which are not particularly restricted, include, for example, 1,4-pentadiene, 1,5-hexadiene, 1,7-octadiene, 1,11-dodecadiene, p-divinylbenzene, 1,4-cyclohexadiene, and 1,5-cyclooctadiene.

The reaction temperature is generally in the range of $-50°$ C. to $300°$ C., preferably $20°$ C. to $200°$ C., and more preferably $20°$ C. to $160°$ C.

The reaction pressure of the present invention is not particularly restricted, but generally the present invention is carried out under a pressure of from normal pressure to 100 atmospheric pressures.

It is not necessarily required to use a solvent in the reaction, but the use of a solvent for dilution to prevent the viscosity from increasing along with the progress of the reaction is one advantageous mode of the present invention. Specific examples of the solvent to be used include aromatic compounds, such as toluene and benzene, ethers, such as diethyl ether, THF, and dioxane, and aliphatic hydrocarbons, such as pentane, hexane, and decane.

When the silane ($SiH_4$) in gas state is used, preferably the polymerization reaction of the present invention is carried out in a pressure-resistant vessel, such as an autoclave, under the said pressure to 100 atmospheric pressures.

The amount of the dienes to be used per mol of the silane, which amount is not particularly restricted is generally of the order of 0.001 to 100 mol, and preferably 0.1 to 10 mol.

The amount of the above rare earth metal complex to be used as a catalyst may be a so-called catalytic amount; namely, of the order of 0.0001 to 0.5 mol, and preferably 0.001 to 0.05 mol, per mol of the silane.

When the dienes have a structure represented by the following formula (III):
formula (III)

$$CH_2=CH—A—CH=CH_2$$

wherein A represents a divalent organic group, such as methylene, ethylene, butylene, hexylene, decylene, and p-phenylene, the polycarbosilanes obtained by the method of the present invention are represented by the following formula (IV):

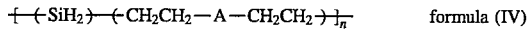  formula (IV)

wherein n is a positive integer, and A has the same meaning as defined above.

In the above formula (IV), n is generally 2 to 10,000, preferably 10 to 5,000, and more preferably 10 to 1,000.

The weight-average molecular weight of the polycarbosilanes obtained by the method of the present invention is generally 200 to 1,000,000, and preferably 1,000 to 500,000.

The end group of the polycarbosilanes obtained by the method of the present invention may be hydrogen or $SiH_3$.

Recovery of the reaction product can be carried out easily by removing the solvent and the unreacted raw materials, and then effecting reprecipitation, preparative GPC, etc.

According to the present invention, polycarbosilanes can be obtained in a high yield from silane ($SiH_4$) and dienes, the industrial significance of the present invention is great.

Now, the present invention will be described more specifically with reference to the following Examples, but the present invention is not limited to them.

EXAMPLE 1

Bis(pentamethylcyclopentadienyl)[bis(trimethylsilyl)methyl]neodymium (0.01 mmol), 1,7-octadiene (2.5 mmol), and benzene (4 ml) were charged into a stainless steel autoclave (with a 37-ml glass insert), and 1.9 atmospheric pressures (2.5 mmol) of silane ($SiH_4$) was injected thereinto.

After the mixture was heated and stirred for 5 hours in a hot water bath at $80°$ C. the solvent was removed under a high vacuum ($10^{-4}$ mmHg), to obtain 344 mg (96.9%) of a highly viscous liquid. GPC (THF): Mw=7,000 (Mw/Mn= 3.71).

$^{29}$Si-NMR ($C_6D_6$, DEPT45, DEPT90, DEPT135): the large signal at $-28.64$ ppm belonged to $SiH_2$, and the small signal at $-59.69$ ppm belonged to the terminal $SiH_3$. $^{13}$C-NMR ($C_6D_6$): since four signals at 9.53 ppm, 25.88 ppm, 29.62 ppm, and 33.33 ppm, were observed, the structure having the following formula (V), in which these silicon atoms are linked through 1,8-octylene units, was identified:

  formula (V)

wherein n has the same meaning as defined above. The end group of the polycarbosilane is a hydrogen or a silyl group.

EXAMPLE 2

Bis(pentamethylcyclopentadienyl)[bis(trimethylsilyl)methyl]neodymium (0.01 mmol), 1,7-octadiene (2.5 mmol), and benzene (4 ml) were charged into a stainless steel autoclave (with a 37-ml glass insert), and 1.9 atmospheric pressures (2.5 mmol) of silane ($SiH_4$) was injected thereinto.

The mixture was heated and stirred for 48 hours in a hot water bath at $80°$ C. The solvent was removed from the gel product under a high vacuum, to obtain 336 mg (94.6%) of a solid. The solid was insoluble in benzene, o-dichlorobenzene, and THF. IR: 2122 cm$^{-1}$.

Having described our invention as related to the present embodiments, it is our intention that the invention not be limited by any of the details of the description, unless otherwise specified, but rather be construed broadly within its spirit and scope as set out in the accompanying claims.

What we claim is:

1. A method for producing polycarbosilanes, which comprises polymerizing silane of the formula $SiH_4$ with an α,ω-alkadiene in the presence of an organic neodymium complex, wherein said polycarbosilanes obtained from said polymerizing are represented by the following formula (IV):

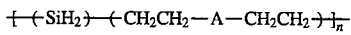

wherein n is a positive integer of 2 to 10,000 and A represents a divalent organic group.

2. The method for producing polycarbosilanes as claimed in claim 1, wherein the α,ω-alkadiene is 1,4-pentadiene, 1,5-hexadiene, 1,7-octadiene, 1,11-dodecadiene, p-divinylbenzene, 1,4-cyclohexadiene, or 1,5-cyclooctadiene.

3. The method for producing polycarbosilanes as claimed in claim 1, wherein the organic neodymium complex contains halogen, hydrogen, alkyl, aralkyl, aryl, alkylsilyl, arylsilyl, olefins, dienes, triens, tetraenes, cyclodienes, cyclotrienes, cyclotetraenes, allyl, alkoxy, aryloxy, alkylthio, arylthio, cyclopentadienyl, methylcylopentadienyl, dimethylcyclopentadienyl, pentamethylcyclopentadienyl, alkylamines, arylamines, pyridines, alkylphosphines, arylphosphines, alkylarylphosphines, alkylisocyanides, arylisocyanides, or ethers, which are unsubstituted or substituted.

4. The method for producing polycarbosilanes as claimed in claim 1, wherein the orqanic neodymium complex contains hydrogen, alkyl, pentamethylcyclopentadienyl, or tetrahydrofuran.

5. The method for producing polycarbosilanes as claimed in claim 1, wherein the organic neodymium complex is represented by formula (I):

formula (I)

$Cp'_2MR$ wherein Cp' represents a cyclopentadienyl group or its substituted group, M represents neodymium, and R represents hydrogen, an alkoxy group, a monovalent organic group, or a monovalent silyl group.

6. The method for producing polycarbosilanes as claimed in claim 5, wherein the group represented by R in formula (I) is hydrogen, methyl, trimethylsilymethyl, bis(trimethylsilyl)methyl, neopentyl, phenyl, or benzyl.

7. The method for producing polycarbosilanes as claimed in claim 1, wherein the organic neodymium complex is $Cp*_2NdCH(SiMe_3)_2$, wherein Cp* represents a pentamethylcyclopentadienyl group, and Me represents a methyl group.

8. The method for producing polycarbosilanes as claimed in claim 1, wherein the reaction temperature is in the range of −50° C. to 300° C.

9. The method for producing polycarbosilanes as claimed in claim 1, wherein the reaction pressure is a pressure of from normal pressure to 100 atmospheric pressures.

10. The method for producing polycarbosilanes as claimed in claim 1, wherein the polymerization reaction is carried out in a solvent selected from the group consisting of aromatic compounds, ethers, and aliphatic hydrocarbons.

11. The method for producing polycarbosilanes as claimed in claim 1, wherein the amount of the α,ω-alkadiene to be used per mol of the silane is of the order of 0.001 to 100 mol.

12. The method for producing polycarbosilanes as claimed in claim 1, wherein the amount of organic neodymium complex to be used is of the order of 0.0001 to 0.5 mol, per mol of the silane.

13. The method for producing polycarbosilanes as claimed in claim 1, wherein the divalent organic group is selected from the group consisting of methylene, ethylene, butylene, hexylene, decylene, and p-phenylene.

14. The method for producing polycarbosilanes as claimed in claim 1, wherein n is 10 to 1,000.

15. A method for producing polycarbosilanes, which comprises polymerizing silane of the formula $SiH_4$ with a diene represented by formula (III):

$$CH_2=CH-A-CH=CH_2$$

wherein A represents a divalent organic group, in the presence of an organic neodymium complex, wherein said polycarbosilanes obtained from said polymerizing are represented by the following formula (IV):

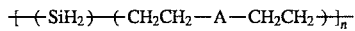

wherein n is a positive integer of 2 to 10,000 and A represents a divalent organic group.

* * * * *